United States Patent

Mayerovitch

[11] 4,194,498
[45] Mar. 25, 1980

[54] SOLAR COLLECTOR CELL AND ROOF FLASHING ASSEMBLY AND METHOD OF CONSTRUCTING A ROOF WITH SUCH AN ASSEMBLY

[75] Inventor: Myron D. Mayerovitch, Yorba Linda, Calif.

[73] Assignee: Frank Mayer, Yorba Linda, Calif.

[21] Appl. No.: 924,135

[22] Filed: Jul. 13, 1978

[51] Int. Cl.² .............................................. F24J 3/02
[52] U.S. Cl. .................................. 126/450; 52/200; 165/76; 165/137
[58] Field of Search ............... 126/270, 271; 237/1 A; 165/76, 137; 52/27, 173, 200

[56] References Cited

U.S. PATENT DOCUMENTS

| | | | |
|---|---|---|---|
| 2,968,263 | 1/1961 | Huston et al. | 52/200 |
| 3,995,614 | 12/1976 | Cerra et al. | 126/271 |
| 4,058,111 | 11/1977 | Wendel | 126/271 |
| 4,099,517 | 7/1978 | McRae | 126/271 |
| 4,120,288 | 10/1978 | Barrett | 126/271 |

*Primary Examiner*—James C. Yeung
*Attorney, Agent, or Firm*—Fischer and Tachner

[57] ABSTRACT

A solar collector cell formed as an integral portion of a roof flashing is disclosed as comprising a flashing base having a dihedral surface including a larger base portion and a smaller ramp portion, and a solar collector cell container built integrally with the base portion of the flashing. The combination is designed to be installed in the roof of a dwelling or other building structure. The container portion of the flashing is substantially shorter in height above the roof line than conventional solar collector cell structures added to a roof subsequent to its construction. As a result, the invention gives the building constructor or owner, the option of either including the solar cell components at the time of construction of the roof to provide a solar heating device, or to fill the solar collector cell container with a temporary support structure, such as roof shakes or tiles. The shape of the solar collector cell and flashing assembly permits the solar collector cell structure to be camouflaged by overlying shakes or tiles of which the roof is constructed.

4 Claims, 6 Drawing Figures

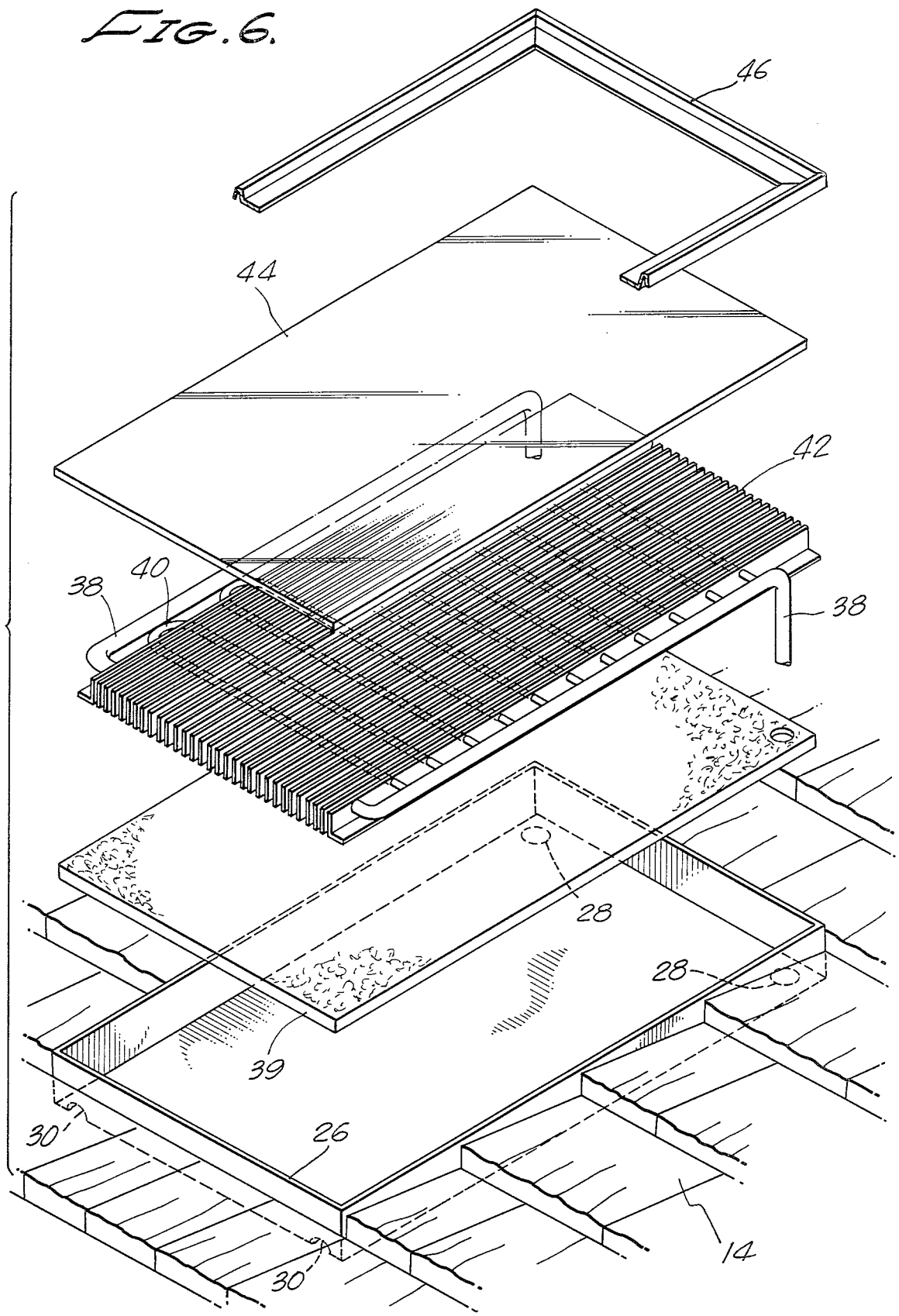

SOLAR COLLECTOR CELL AND ROOF FLASHING ASSEMBLY AND METHOD OF CONSTRUCTING A ROOF WITH SUCH AN ASSEMBLY

BACKGROUND OF THE INVENTION

This invention relates generally to solar energy and the collection thereof by collector cells on the roof of a structure in which such incident sunlight may be used to provide the energy for heating the water in water heaters and for other similar uses in conjunction with appliances commonly found in dwelling and other building structures.

More specifically, this invention relates to a combined solar collector cell and integral roof flashing assembly which is preferably installed on the roof of a structure at the time of original construction, but which, unlike prior art conventional solar collector cell containers, may be inconspicuously integrated into the basic roof structure. Thus, this invention provides the option to the builder or owner of either installing a functional system for solar energy collection which provides a minimum impact on the ornamental appearance of the roof structure, or of camouflaging a cell container into the roof structure in an undeployed condition and then functionally deploying a solar-collection system at a later time with a minimum of additional cost and inconvenience to the occupants.

STATEMENT OF THE PRIOR ART

In recent years the substantially increased cost and reduced availability of well-known conventional sources of energy have made previously unconventional sources of energy much more cost competitive and practical. As a result, one such type of previously unconventional energy sources; namely, solar energy, is becoming an increasingly important portion of the overall energy supply. As a consequence of this new importance, a new industry has sprung up; namely, the solar energy industry, which among its many facets, includes hundreds of manufacturers and suppliers of solar energy collection devices which are commonly installed on the roofs of both residential and nonresidential buildings. These solar collectors provide means for utilizing the inherent heat energy in incident sunlight to heat a liquid such as water that is contained in a radiator-like structure. Such a structure may include copper serpentine shaped coils to provide higher efficiency heat collection.

Numerous construction techniques in collector cell designs have been made available by the various suppliers in the industry. However, at least two problems associated with such prior art solar collector cell systems intended for installation on the roofs of residential and nonresidential buildings persist; namely, (1) the deployment of solar collector cell systems on a roof is very costly and highly inconvenient to the occupants at the time such systems are being installed because of substantial modification of the roof structure; and (2) the resulting solar collector cell system is a high profile structure that substantially interferes with the ornamental appearance of the roof line and thereby detracts from the overall appearance of the building.

These problems associated with conventional solar cell installation may be better understood by those familiar with the construction industry in general, who are aware of the commonly accepted premise that it is usually more economical and convenient to add a system into the structure at the time of the original construction of the building than it is to add a system at a later date by modification and reconstruction of a portion of the building structure to adapt it to the new system. Based upon this premise, it would be preferable to incorporate solar collection cell systems in a roof at the time the building is originally constructed. Unfortunately, the long term benefits of such a preferred approach must always be balanced against the added cost resulting from the inclusion of a fully functional solar collector heating system. The inclusion of such a system makes the cost of the overall structure substantially higher, thus rendering it more difficult to sell the building, particularly to those potential buyers who still aren't convinced of the need for a solar heating system.

SUMMARY OF THE INVENTION

The present invention substantially overcomes or reduces the persistent disadvantages of prior art conventional solar collector cell systems by providing a solar collector cell container that may be structurally integrated into the roof at the time of construction at relatively low cost. Furthermore, the collector cell container of the present invention is designed to provide the builder with an option of functionally deploying the solar collection cell system at the time of original construction of the roof, or of camouflaging the cell container into the roof structure at the time of original construction. With the latter option, the camouflaged container is readily converted to a fully functional deployed solar collector cell system at any later time that may be deemed more preferable by the building's occupants.

Thus, it is an object of the present invention to provide a solar collector cell structure for the roofs of buildings, that substantially overcomes the disadvantages of the prior art.

It is also an object of the present invention to provide a combined solar collector cell structure and roof flashing which may be inexpensively installed in a roof structure at the time of original construction of the building, but be functionally deployed at the option of the builder or owner at either the time of original construction of the building or at a later time after being camouflaged into the roof line.

It is a further objective of the present invention to provide a method for building a roof structure that employs the basic solar collector cell container integrated into the roof line so that that container may be easily camouflaged and thus hidden into the basic roof structure to provide the builder or owner with the option of either deploying the solar collection system at the time of construction or at a later time.

It is still a further object of the present invention to provide a low cost, low profile, solar collection system that may be integrated into the roof structure of a building and be functionally deployed at either the time of the original construction of the building or at a later time so that the construction industry may provide the general public with the incentive to utilize solar energy collection systems when it is most beneficial financially for them to do so and thus effectuate a decreasing dependency upon more conventional sources of energy.

BRIEF DESCRIPTION OF THE DRAWINGS

In addition to the above noted objects and advantages, others will become evident hereinafter as a result of the following description of a preferred embodiment of the invention described by way of example and illustrated in the accompanying drawings in which:

FIG. 6 is an enlarged view of the container portion of the invention providing an exploded view of the components of a typical embodiment of a functionally deployed solar collector cell utilizing the present invention.

DETAILED DESCRIPTION OF THE INVENTION

Figure 1:
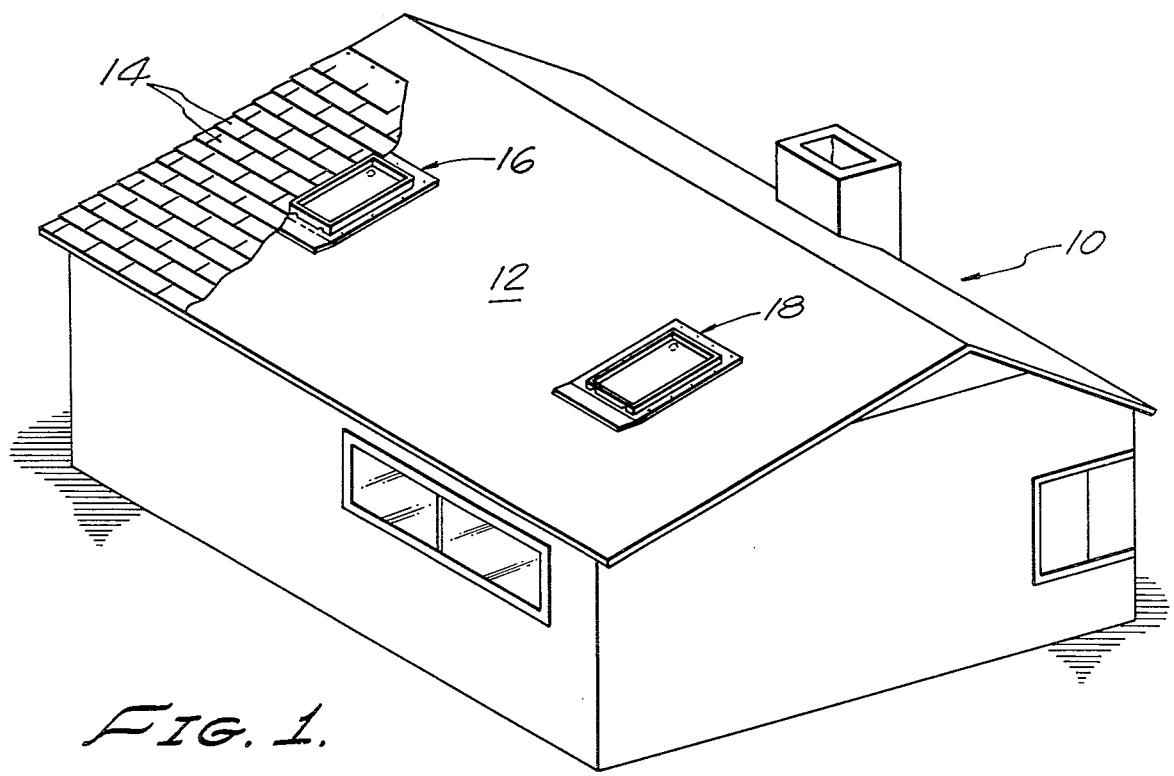
FIG. 1 is an isometric view of a dwelling that employs a roof including the present invention, the roof being constructed in accordance with the method of the present invention.

Referring now to FIG. 1, there is shown therein a typical example of a building in the form of a dwelling in which the roof is under construction and includes two of the solar collector cell container and flashing assemblies comprising the present invention. Thus, FIG. 1 includes the dwelling structure 10, including the roof 12 under construction utilizing well known roof shakes 14, held in place by nails 15 or the like and shown partially overlapping solar collector cell container and roof flashing assembly 16. It is to be noted that at this point in the construction of roof 12, the builder still has the option of either camouflaging cell assemblies 16 and 18 or deploying cells 16 and 18 by installing the solar collector cell components as will be discussed below. However, before discussing the details of the two possible installation alternatives, the details of the present invention irrespective of the installation alternative utilized, are first discussed.

Figure 2:
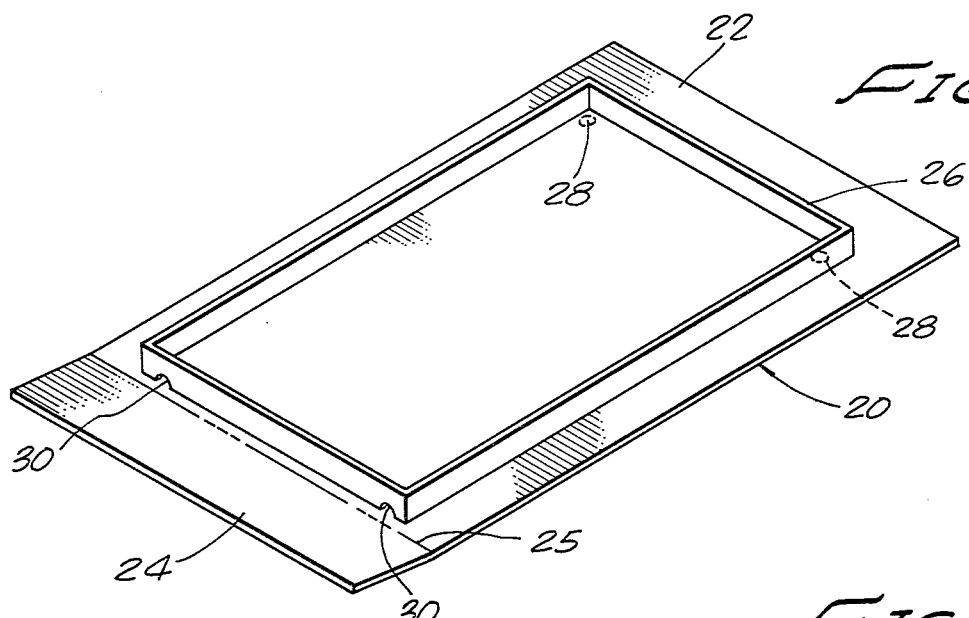
FIG. 2 is an isometric view of the present invention.
Figure 3:
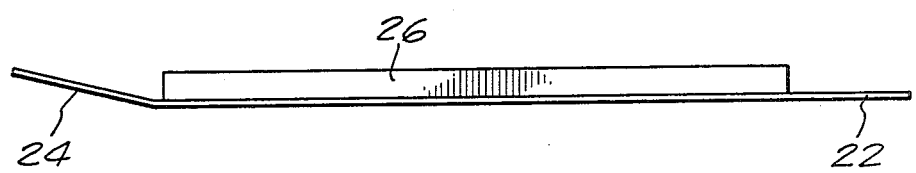
FIG. 3 is a side view of the present invention.

Referring now to FIGS. 2 and 3, there is shown therein the solar collector cell container and roof flashing assembly 20 comprising a flashing base 22, a flashing ramp 24, a solar collector cell container 26, a pair of knockout holes 28 and a pair of weep holes 30. Typically, the assembly 20 is rectangular and four feet by eight feet in overall dimensions, with container 26 also rectangular and three feet by seven feet in dimensions. In one embodiment, the material used for the basic structure is 26 guage galvanized sheet steel, but aluminum would also be satisfactory.

In a typical installation, assembly 20 is mounted on an inclined roof structure that most closely faces that direction from which sunlight is incident most of the time. Thus, the assembly is preferably mounted on the South facing inclined portion of a roof in the northern hemisphere and on the North facing roof portion in the southern hemisphere. It is typical for the rectangular configuration of the embodiment shown in FIGS. 2 and 3 for the invention to be installed on the roof surface before the shakes or tiles of the roof are added. Furthermore, it is preferred that the ramp portion 24 of the assembly 20 be installed as the lower end of the assembly on the roof. The upwardly turned ramp, when pressed against the roof surface by the overlying shakes, tends to increase the resistance of the assembly to water flow below the shakes mounted on the roof structure below the assembly. The weep holes 30 also increase the resistance to collection of water after a rain storm by providing a natural exit for any rain water that might otherwise be trapped within container 26. As will be discussed hereinafter in conjunction with FIGS. 5 and 6, knockout holes 28 are not implemented until the solar collector cell container receives the components for full functional deployment of the solar collector cell. At that time, the knockout holes are utilized to provide entrance and exit means for water passage through the pipe system of the solar collector cell.

Figure 4:
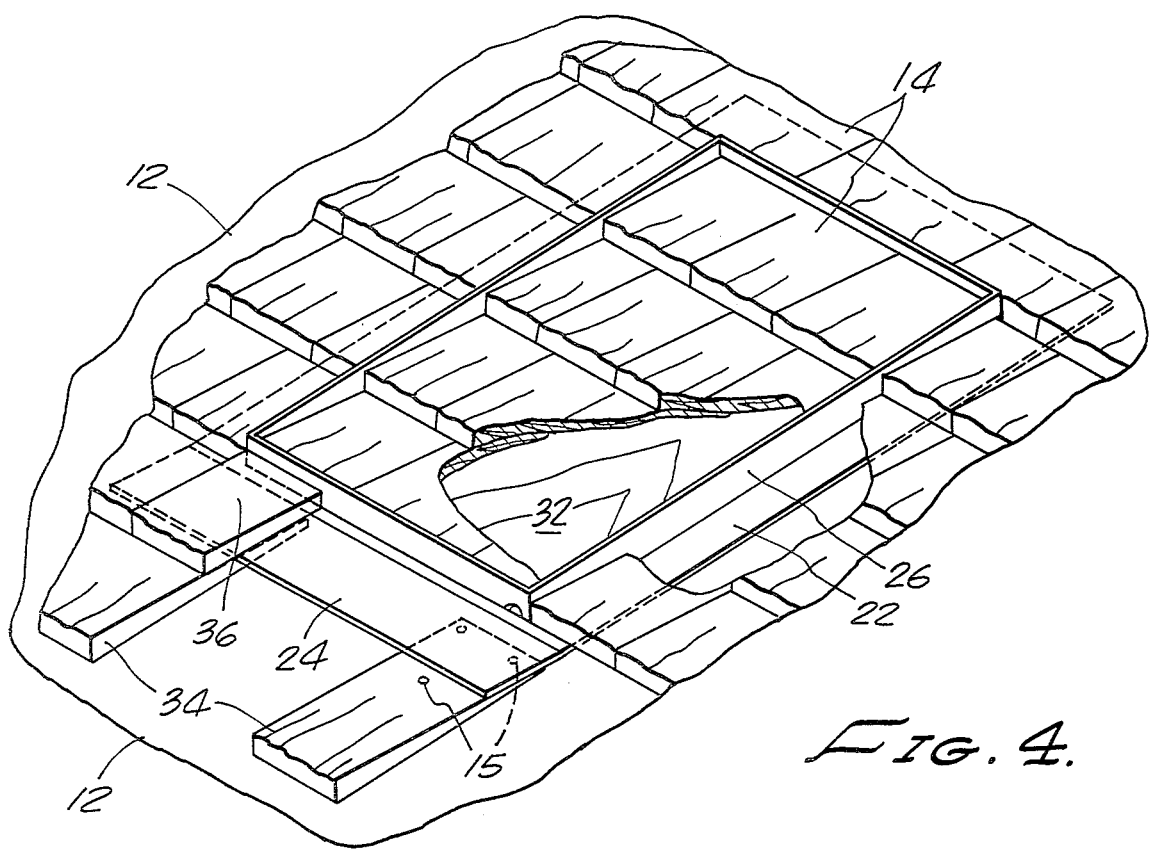
FIG. 4 is an isometric cut-away view of the present invention, shown in its camouflaged condition.

Referring now to FIG. 4, there is shown therein a camouflaged configuration of the present invention in which the shakes 14 have been secured to the assembly 20 and the roof 12 on the surface of flashing base 22, as well as inside container 26 and on flashing ramp 24. In addition, an optional filler material, such as plywood board 32, has been placed below the roof shakes inside container 26 to raise the surface of the shakes. Thus, FIG. 4 illustrates the present invention in its camouflaged mode; that is, in which although the combined cell container and flashing assembly is installed in the roof of the building, only the walls of container 26 remain visible. Even the walls of container 26 may be painted virtually the same color as the surrounding shake material, so that the installed assembly of the present invention, when in a camouflaged condition, is virtually invisible.

As shown in FIG. 4, the ramp portion 24 of the assembly is covered in a slightly different fashion from the rest of the assembly in that there are roof shakes, such as shake 34, that are installed underneath ramp 24, between the assembly and the roof structure. In addition, there are roof shakes such as roof shake 36, that are installed above the ramp to create downward forces on the lowermost edge of ramp 24 to create a bending moment around crease 25 between ramp 24 and base 22 of the flashing.

Figure 5:
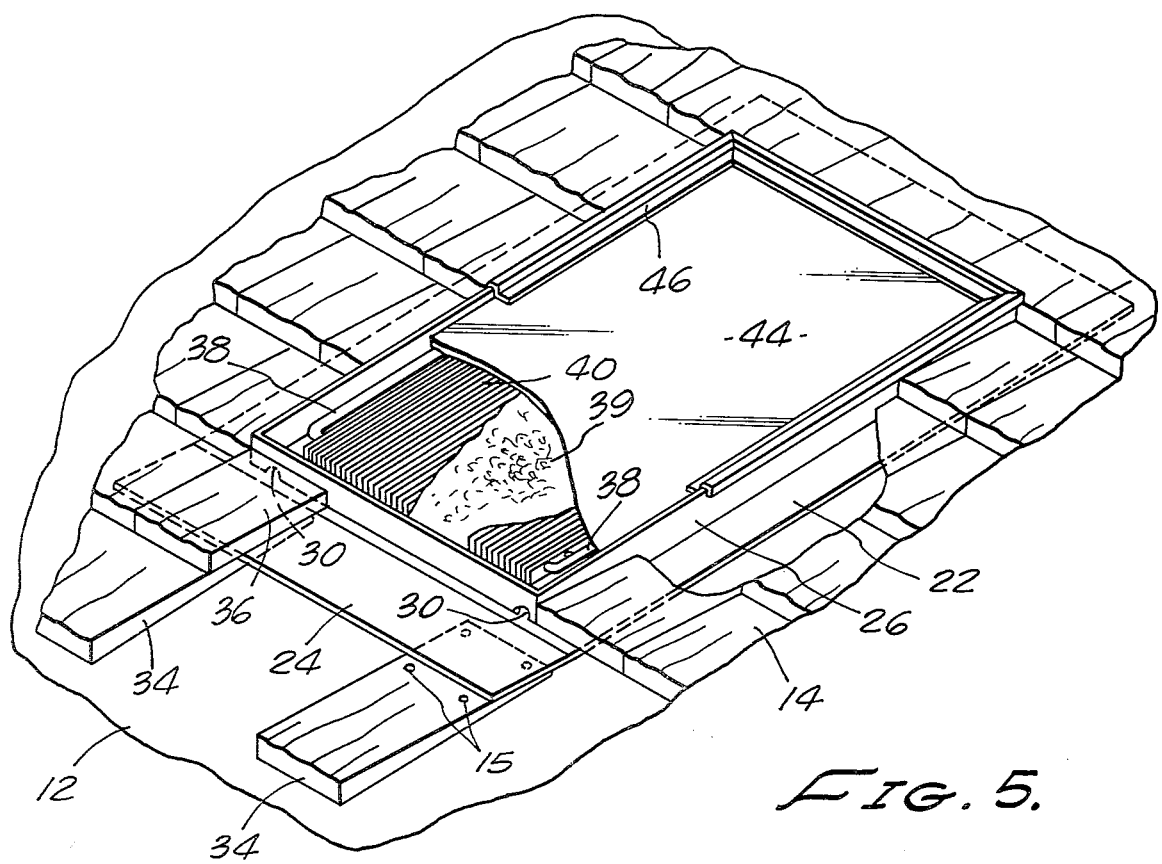
FIG. 5 is an isometric cut-away view of the present invention, shown in its functionally deployed condition.

Referring now to FIGS. 5 and 6, the present invention is illustrated in its functionally deployed mode of operation, which could, of course, be implemented at either the time of original construction of the roof or at any later time after the originally installed collector cell and roof flashing assembly had been camouflaged as discussed above in conjunction with FIG. 4. As indicated in FIGS. 5 and 6, when full functional deployment is desired, it is preferable to remove the shake material 14 and filler material 32 from the inside portion of container 26 and to instead install the various components that comprise the collector cell. For example, the components may include the pipes that are used for the transfer of a liquid medium to and from the cell, the heat collecting coil system including a radiator finlike copper core that increases the efficiency of heat collection, overlying sunlight transmitting element such as a glazing material that protects the components from inclement weather, but that still passes the warming sunlight on to the solar energy collection components, an overlying clip to secure the various components, including the sunlight transmitting cover, to the assembly and an insulating material which is preferably placed on the floor of the cell container 26 prior to the installation of the cell components into the system.

It should be understood that no invention is claimed in the cell components per se since it is well known in the art to employ such core type systems as well as variations in structure which are also deemed preferable to increase the efficiency of heat collection. However, for purpose of completeness, FIG. 6 is provided to illustrate one method of combining the cell components for the embodiment of the present invention in which the solar collector cell has been functionally deployed.

Referring now more specifically to FIG. 6, there is shown therein input/output pipes 38, insulation material 39, serpentine coil pipes 40, heat collecting core 42, glazing material 44, and V-clip 46. The input/output pipes 38 are channelled through knockout holes 28 (see FIG. 2) where they are connected to a source of water supply, a pumping means, and the appliance in which the heated water is utilized, all of which are not shown as they do not form part of the present invention. The incoming water is channelled through pipes 40, which comprise a serpentine-shaped coil of pipe embedded within heat collecting core 42. This arrangement of pipe and core is one well known method of optimizing the heating effect of incident sunlight on the water or other liquid medium contained within the pipes. Ultimately, the water or other liquid medium is channelled out to the second input/output pipe 38 and back through the system to an appliance in which the heated liquid is utilized. The insulation material 39 is typically an aluminum foil coated cellulose foam, but any suitable insulation will do just as well. In the process of functionally deploying a solar collector cell using the present invention, after the flashing is installed and the container empty or emptied after being camouflaged, insulation material 39 is first installed. Then coil core 42 is installed and painted black to optimize heat collection. The input/output pipes 38 are channelled through the knockout holes 38 to the rest of the system. Finally, the glazing material 44 is placed in position and the combination is held in place with a clip such as V-clip 46 which includes a flange covering the perimeter of the glazing 44.

It will now be readily apparent that what has been disclosed herein is a novel solar collector cell container and roof flashing assembly, as well as a novel method of constructing a roof including such an assembly. It will also now be apparent that the assembly and method of constructing a roof using the assembly, provide a substantially lower cost and more convenient means for deploying solar collector cell apparatus on the roofs of buildings such as dwellings.

Furthermore, it will be apparent that the present invention provides a means of giving the builder or owner of the building in which the invention is utilized, the option of either deploying the solar collector cell components in a fully functional system at the time of original construction of the roof, or of providing means for camouflaging the basic structure of the solar cell collector into the roof structure at the time of original construction, so that at any later time, when the installation of the components of a solar cell system is deemed more desirable, it is far less costly and inconvenient to the occupants of the building to then deploy such a system. The result is a low cost, low profile solar collector cell system that can be built by subcontractors and component manufacturers, assembled on the job at the installation site, and which results in less breakage, lower freight costs, and higher reliability because of the decreased probability of latent damage.

Although a specific embodiment of the invention has been disclosed herein, it will now be apparent to those having ordinary skill in the art to which the invention pertains that many other embodiments of the invention may be constructed. For example, in view of applicants teaching herein disclosed, it will now be apparent that there may be variations in materials, dimensions, and basic design that would permit use of other types of solar collector cells than that which has been disclosed herein by way of example. Accordingly, the invention is not deemed to be limited, except as defined by the appended claims.

I claim:

1. A method for constructing an inclined shake roof that incorporates a solar collector structure and may be functionally deployed at the time of roof construction and also may be camouflaged for later functional deployment with a minimum of roof modification; the method comprising the steps of:
 a. installing an improved solar collector cell container and roof flashing assembly of the type having a plurality of contiguous substantially vertical walls forming a container for receiving an apparatus for heating a liquid by sunlight incident upon such a roof; and having the improvement comprising:
  a roof flashing having a substantially planar base portion underlying said vertical walls and extending perpendicular to and beyond said walls external to said container to form a substantially contiguous flange along the external perimeter of said container;
  said roof flashing also having a substantially planar ramp portion integral with said flange along at least a portion thereof and extending from said flange at an obtuse angle with respect to said base portion, a substantially straight crease line being formed along the junction between said ramp portion and the flange portion from which it extends;
  said roof flashing being adapted to receive a plurality of roof shakes overlying and substantially covering said ramp portion and said flange to be secured thereto whereby said roof flashing may be hidden from view and said ramp may be bent down toward and in forced engagement with said roof;
 b. filling the container of said assembly with a temporary filler material that substantially occupies the entire enclosed volumne of said container; and
 c. installing roof shakes on said flashing base, and on said filler material.

2. The method of constructing a roof as recited in claim 1, and further comprising the steps of:
 e. removing the roof shakes on said filler material;
 f. replacing said filler material with a solar collector cell; and
 g. covering said container with a glazing material that transmits sunlight to said cell.

3. In a solar collector cell and roof flashing assembly of the type adapted for installation on an inclined shake roof of a building structure and having a plurality of contiguous substantially vertical walls forming a container for receiving an apparatus for heating a liquid by sunlight incident upon such a roof, the improvement comprising:
 a roof flashing having a substantially planar base portion underlying said vertical walls and extending perpendicular to and beyond said walls external to said container to form a substantially continuous flange along the external perimeter of said container;

said roof flashing also having a substantially planar ramp portion integral with said flange along at least a portion thereof and extending from said flange at an obtuse angle with respect to said base portion, a substantially straight crease line being formed along the junction between said ramp portion and the flange portion from which it extends;

said roof flashing being adapted to receive a plurality of roof shakes overlying and substantially covering said ramp portion and said flange for being secured thereto on such a roof, whereby said roof flashing may be hidden from view and said ramp may be bent down toward, and in forced engagement with, said roof.

4. The improvement recited in claim 3 further comprising:

a filler material that substantially occupies the enclosed volume of said container; and roofing shakes overlying and secured to said filler material.

* * * * *